(12) United States Patent
Bhalla

(10) Patent No.: US 6,285,022 B1
(45) Date of Patent: Sep. 4, 2001

(54) FRONT ACCESSIBLE OPTICAL BEAM SWITCH

(75) Inventor: Kulbir Singh Bhalla, Red Bank, NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/420,442

(22) Filed: Oct. 18, 1999

(51) Int. Cl.[7] ............................................. G01J 1/36
(52) U.S. Cl. ............................. 250/227.22; 385/16
(58) Field of Search .................... 250/227.22, 227.21, 250/227.24, 216; 385/16, 12, 22, 17, 18; 200/DIG. 36, DIG. 47

(56) References Cited

U.S. PATENT DOCUMENTS 4,478,494 * 10/1984 Soref ...................................... 385/16
5,206,497   4/1993 Lee ..................................... 250/201.1

* cited by examiner

Primary Examiner—Que T. Le
(74) Attorney, Agent, or Firm—John A. Caccuro

(57) ABSTRACT

An optical beam switch is designed for improved serviceability by mounting two fiber optic beam deflection arrays to face the front of a rack assembly. Inside the optical beam switch, a reflecting device is located behind each of the two fiber optic beam deflection arrays and used to reflect the light beams between the two fiber optic beam deflection arrays. Front access to the two fiber optic beam deflection arrays is then readily available whether the optical beam switch is mounted horizontally or vertically in the rack assembly.

7 Claims, 4 Drawing Sheets

ACCESS TO THE CLUSTER ASSEMBLIES REQUIRED FROM THE SIDES

blank …

FRONT ACCESSIBLE OPTICAL BEAM SWITCH

CROSS-REFERENCE TO RELATED APPLICATION

Related subject matter is disclosed in the pending application entitled "STRICTLY NON-BLOCKING SCALABLE MATRIX OPTICAL SWITCH" filed on Feb. 20, 1998 by B. H. Lee, Ser. No. 09/026,856, now U.S. Pat. No. 6,005,998, which is assigned to the same assignee as the present application.

TECHNICAL FIELD OF THE INVENTION

The present invention relates to optical switches, and more particularly, to an optical switch that is arranged to be accessible from the front when mounted in a rack assembly.

BACKGROUND OF THE INVENTION

In optical transmission, applications exist wherein numerous optical signals carried by respective optical fibers must be switched or routed to a corresponding number of output fibers. Optical cross-connects have been used to provide this optical switching function. The U.S. Pat. No. 5,206,497, issued on Apr. 27, 1993 to B. H. Lee describes an optical cross-connect that uses a free-space optical switching apparatus.

Another type of optical cross-connect can be implemented using a large optical beam steering switch designed by using motor driven beam deflection clusters. Such an arrangement is disclosed in the pending application entitled "STRICTLY NON-BLOCKING SCALABLE MATRIX OPTICAL SWITCH" filed on Feb. 20, 1998 by B. H. Lee, Ser. No. 09/026,856, and assigned to the same assignee as the present application. In one of the Lee arrangements, the beam deflection clusters are mounted on both ends of the beam steering switch. When this optical beam switch is mounted horizontally in an integrated rack assembly, as shown in FIG. 1, access from the sides is required to replace the clusters. However, this violates the frontal accessibility requirement often specified by customers. Horizontal mounting also requires that the optical beam switch span across several integrated rack assemblies, because of its large size. Handling and transportation of the optical beam switch also becomes more difficult. Meeting Telcordia's Network Equipment Building Systems (NEBS) Requirements (e.g., GR-63-CORE, Issue 1) also becomes exceedingly difficult. These problems also increase when the cross-connect size increases.

When the optical beam switch is mounted vertically in a rack assembly, as shown in FIG. 2, then access to the beam deflection clusters requires access via the top and bottom, which is also not easy because of the size of the optical beam switch and the limited space in the rack assembly.

What is needed is an optical beam switch of reduced size and improved accessibility when mounted in a rack assembly.

SUMMARY OF THE INVENTION

In accordance with the present invention, a fiber optic beam switch apparatus is designed for improved serviceability by mounting two fiber optic beam deflection arrays (or clusters) to face the front of a rack assembly. Inside the optical beam switch, a reflecting device is located behind each of the two fiber optic beam deflection arrays and used to reflect the light beams between the two fiber optic beam deflection arrays. Front access to the two fiber optic beam deflection arrays is then readily available whether the optical beam switch is mounted horizontally or vertically in the rack assembly.

More specifically, my fiber optic switch apparatus comprises (1) a first fiber optic beam deflection array mounted to a front face of the fiber optic switch apparatus, (2) a first reflecting device, positioned behind the first fiber optic beam deflection array at about forty five degree angle to the first fiber optic beam deflection array, reflects optical beams received from the first fiber optic beam deflection array, (3) a second fiber optic beam deflection array is mounted to the front face of the fiber optic switch apparatus and disposed along the front face at an appropriate distance away from the first fiber optic beam deflection array, and (4) a second reflecting device, positioned behind the second fiber optic beam deflection array at about forty five degree angle to the second fiber optic beam deflection array, receives reflected optical beams from the first reflecting mirror and further reflects those reflected beams to the second fiber optic beam deflection array.

BRIEF DESCRIPTION OF THE DRAWINGS

In the drawings.

In the following description, identical element designations in different figures represent identical elements. Additionally in the element designations, the first digit refers to the figure in which that element is first located (e.g., 103 is first located in FIG. 1).

DETAILED DESCRIPTION

Figure 1:
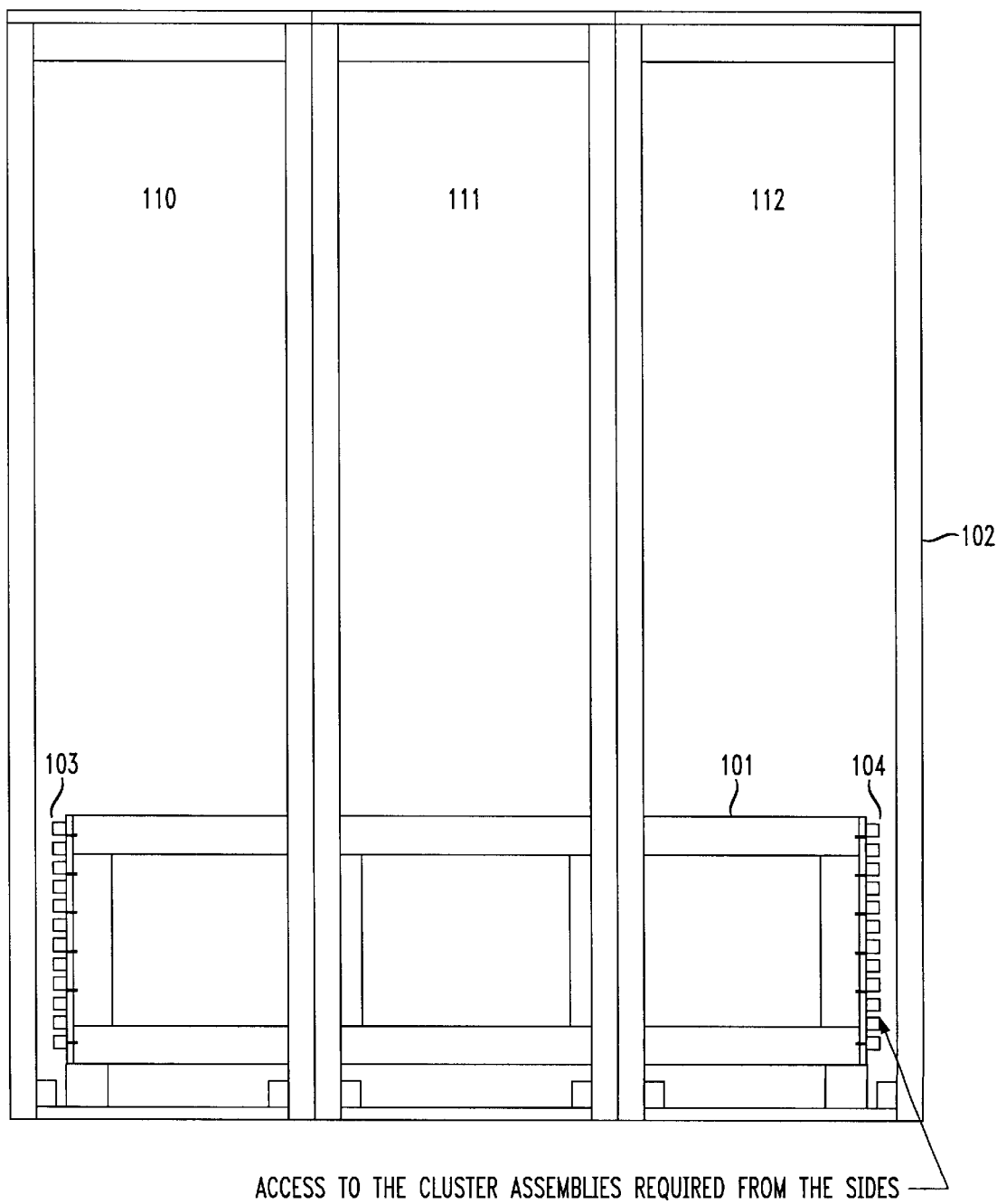
FIG. 1 shows an optical beam steering switch mounted horizontally in a rack assembly and having cluster assemblies requiring access from the sides.

Shown in FIG. 1 is an optical beam steering switch 101 mounted horizontally across the inside of several bays 110–112 of a rack assembly 102 and having cluster assemblies 103 and 104. The cluster assemblies 103 and 104 may be implemented using beam deflection clusters of the type shown, in FIG. 7, and described in the previously-referenced B. H. Lee pending application, which is incorporated by reference herein. The connection of optical fibers to the cluster assemblies 103 and 104, require access by going to the side of the rack assembly 102 and accessing the clusters from the side of the optical beam steering switch 101. Maintenance of cluster assemblies 103 and 104, including removal, addition and replacement the cluster assemblies, also require access by going to the side of rack assembly 102 to access the cluster assemblies. However, access through the side may be extremely difficult in a central office if there are other racks of equipment next to the switch rack assembly 102.

Figure 2:
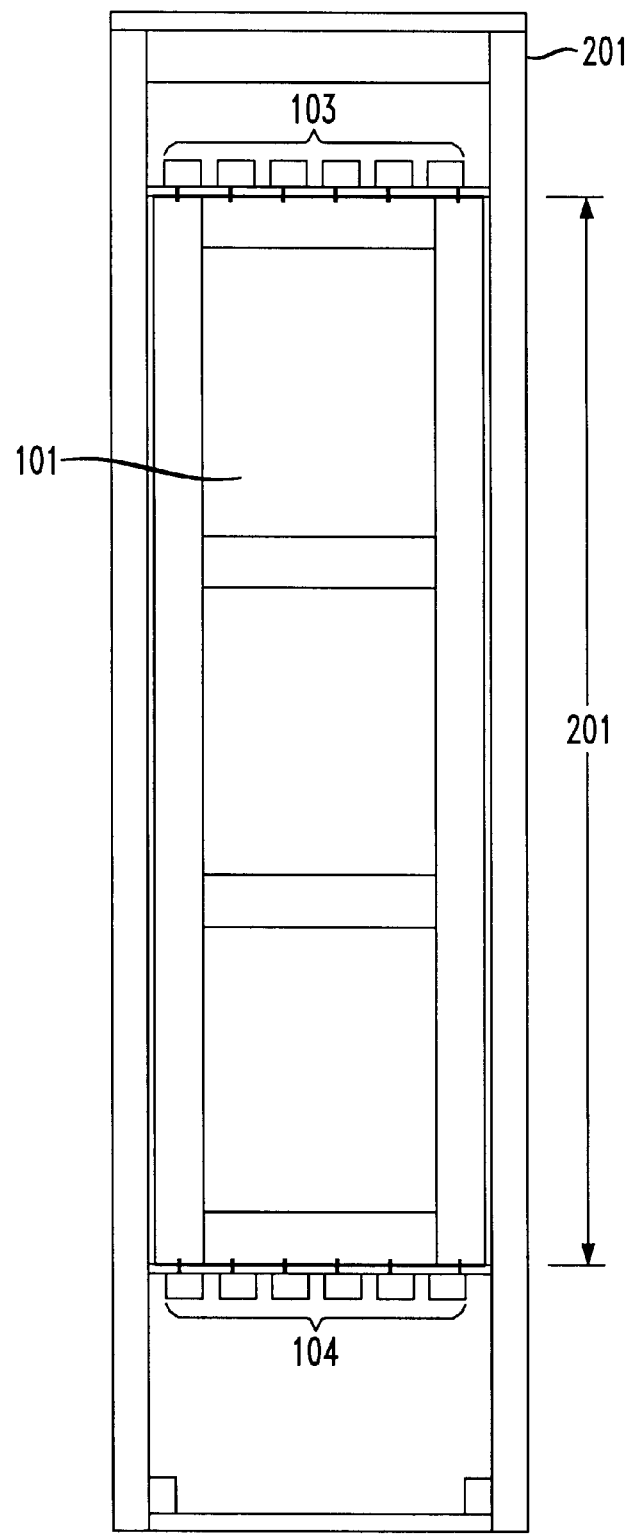
FIG. 2 shows an optical beam switch mounted vertically in a rack assembly and having cluster assemblies requiring access from the top and bottom.

Shown in FIG. 2 is an optical beam switch mounted vertically in a rack assembly and having cluster assemblies requiring access from the top and bottom. In this arrangement, access to clusters 103 and 104 require sufficient clearance between the optical beam steering switch 101 and the top and bottom, respectively, of the rack assembly 201. Since a typical measurement for a 512 port optical fiber cluster assembly is about 68 inches in length, 201, and a typical height of a of a rack assembly is about 84 inches, only about 8 inches are available to provide access to either of the top 103 or bottom 104 cluster.

Figure 3:
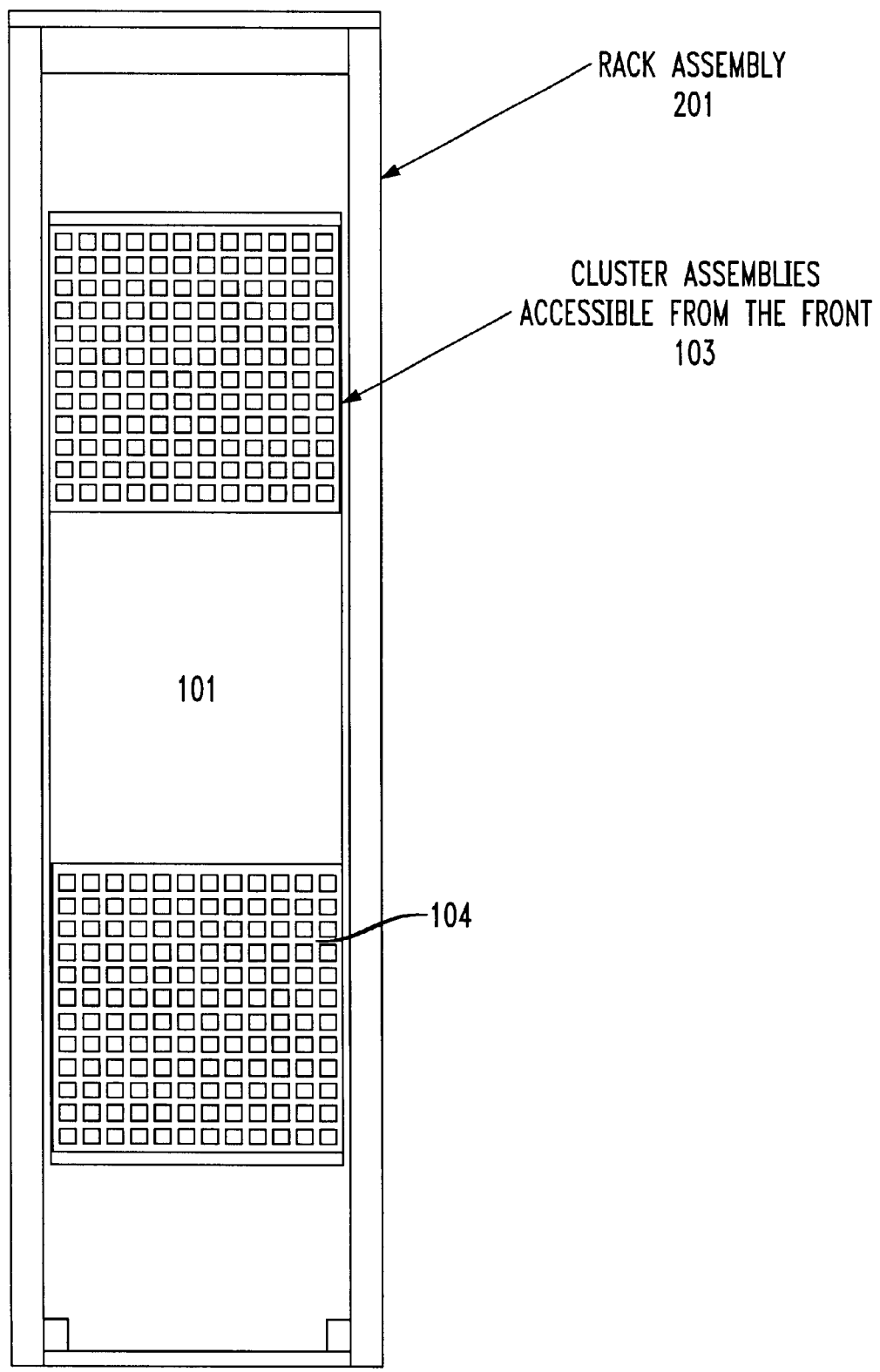
FIG. 3 shows, in accordance with my invention, an optical beam switch mounted vertically in a rack assembly and having cluster assemblies having access from the front.

FIG. 3 shows, in accordance with my invention, an illustrative optical beam switch 101 mounted vertically in a rack assembly 201 and having cluster assemblies 103 and 104 which face the front. As shown, access to the cluster assemblies 103 and 104 is readily accomplished from the front of rack assembly 201. Even if the optical beam switch 101 is mounted horizontally, the cluster assemblies are readily accessible from the front.

Figure 4:
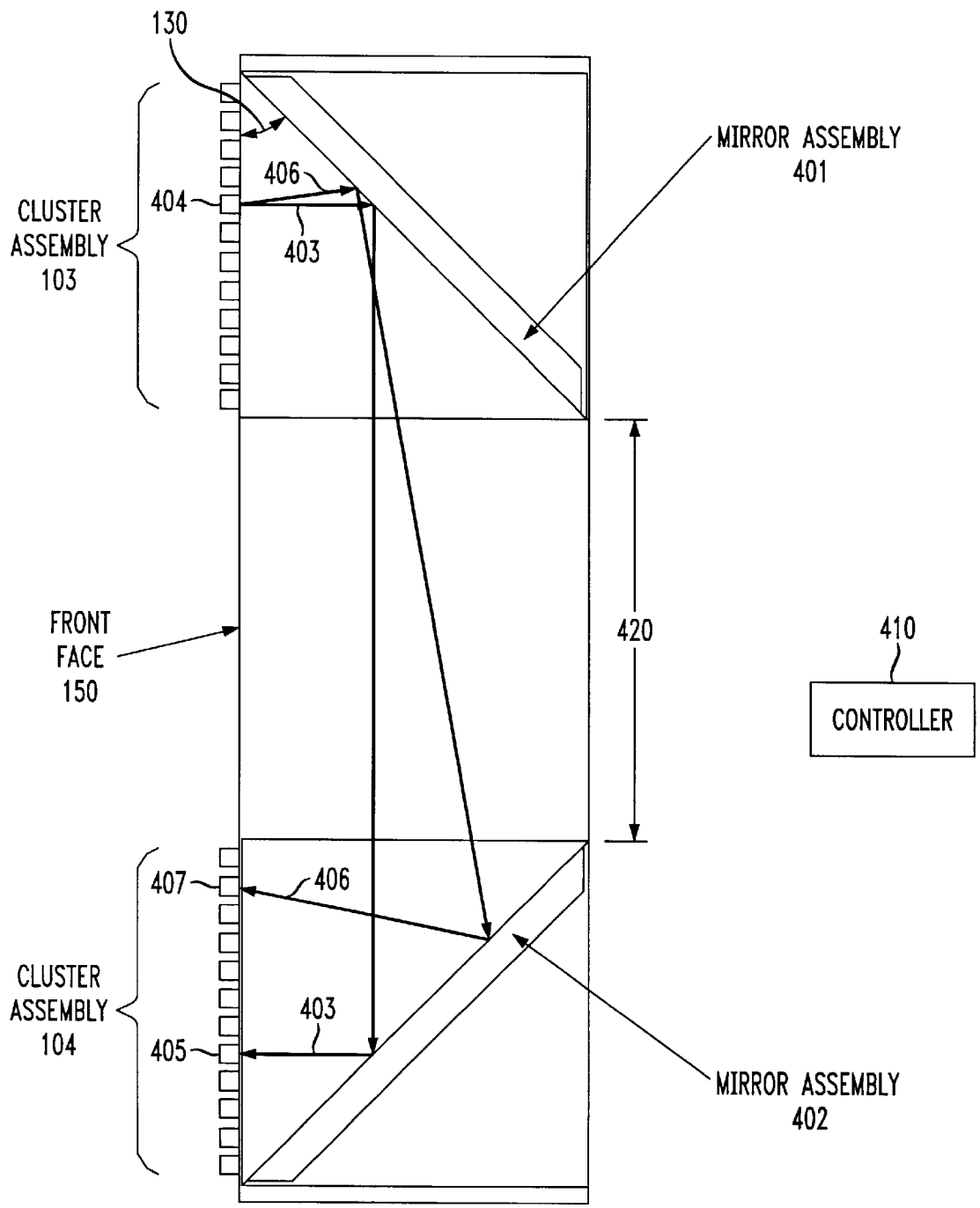
FIG. 4 shows a side view of my optical beam switch, showing the mounting of the mirror and cluster assemblies.

With reference to FIG. 4, there is shown a side view of my optical beam switch 101 showing the mounting of the cluster assemblies 103 and 104 and associated mirror assemblies 401 and 402, respectively. Illustratively, the mirror assemblies may be front surface infrared (FSIR) mirrors. As shown, the cluster assemblies 103 and 104 are mounted on a front face 150 of optical beam switch 101 and the mirror assemblies are mounted to form about a forty five degree angle with the front face of optical beam switch 101. The illustrative first optical beam 403 traces a path that originates at optical cluster unit 404 in cluster assembly 103, is reflected by mirror assembly 401 to mirror assembly 402 where it is reflected to at optical cluster unit 405 in cluster assembly 104. In this example, the optical path 403 exits the optical cluster unit 404 and enters optical cluster unit 405 essentially perpendicular to the respective cluster assemblies, 103 and 104.

The illustrative second optical beam 406 traces a path that originates at optical cluster unit 404, is reflected by mirror assembly 401 to mirror assembly 402 where it is reflected to optical cluster unit 407 in cluster assembly 104. In this example, for optical cluster 104 to send an optical beam to optical cluster unit 407, the optical path 406 must exit optical cluster unit 404 in a non-perpendicular angle and must enter optical cluster unit 407 in a non-perpendicular angle. The controller 410 controls the deflection angles for all of the optical cluster units of cluster assemblies 103 and 104. To establish an optical connection, controller 410 accesses a data base to obtain the proper sending and receiving angle to enable any optical cluster unit of cluster assembly 103 to reach any optical cluster unit of cluster assembly unit 104. The objective is to have the axis of the receiving clusters (the collimator) align with the received optical beam. Since the sending and receiving angles needed for my arrangement of FIG. 4 are different from those required by the arrangements of Figs 1 and 2, the sending and receiving angle data used by controller 410 must be changed accordingly.

Note that the distance 420 is determined by optical and mechanical design. The design is influenced by the size of the cluster assembly arrays 103 and 104. The objective should be for the beam switch 101 to fit inside of a standard equipment rack assembly 102. Depending on the technology used in the cluster assemblies 103 and 104, the distance may be reduced to almost zero length.

Software programs are used by controller 410 to automate the generation of the appropriate sending and receiving angles needed. The controller 410 is typically located in an adjacent equipment rack. To facilitate such programs the mirror assemblies 401 and 402 can be made to be partially transmissive and optical sensors can be mounted at the rear of the front surface mirror of one or more of the mirror assemblies 401 and 402 to monitor the optical beams. The feedback from these optical sensors may then be used by the software program to set the proper sending and receiving angles for the optical cluster units to accomplish any optical switching connection between any two optical cluster units of cluster assemblies 103 and 104. The optical sensors can also be used for general signal monitoring purposes such as monitoring drift and failure of the optical beams.

Note, that while the cluster assemblies 103 and 104 are shown to be flatly mounted to the face of optical beam switch 101, if desirable, they could be mounted on a convex spherically surface (in the manner shown in FIG. 10 of the previously-referenced patent application. The important objective is to align, as much as possible, the axes of the transmitting and receiving optical units. It should also be noted that the present invention can operate with a variety of fiber optic beam deflection arrays besides the cluster assemblies 103 and 104 described in FIG. 7 of the previously-referenced patent application and those described in FIG. 1 of U.S. Pat. No. 5,206,497. While the mirror has been described to reflect the optical beams, other types of reflecting devices may also be used depending on the optical requirements.

What has been described is merely illustrative of the application of the principles of the present invention. Other methods and arrangements can be implemented by those skilled in the art without departing from the spirit and scope of the present invention.

What is claimed is:

1. A fiber optic switch apparatus comprising
   a first fiber optic beam deflection array mounted to a front face of the fiber optic switch apparatus,
   a first reflecting device, positioned behind the first fiber optic beam deflection array at about forty five degree angle to the first fiber optic beam deflection array, reflects optical beams received from the first fiber optic beam deflection array,
   a second fiber optic beam deflection array is mounted to the front face of the fiber optic switch apparatus and disposed along the front face at a predetermined distance away from the first fiber optic beam deflection array, and
   a second reflecting device, positioned behind the second fiber optic beam deflection array at about forty five degree angle to the second fiber optic beam deflection array, receives reflected optical beams from the first reflecting device and further reflects those reflected beams to the second fiber optic beam deflection array.

2. The fiber optic switch apparatus of claim 1 wherein the first and second fiber optic beam deflection arrays include optical fiber cluster assemblies.

3. The fiber optic switch apparatus of claim 2 wherein the first and second fiber optic beam deflection arrays are mounted on a convex spherical surface on the front face.

4. The fiber optic switch apparatus of claim 1 wherein the first and second fiber optic beam deflection arrays are flatly mounted on the front face.

5. The fiber optic switch apparatus of claim 1 wherein the first and second reflecting devices are mirrors.

6. The fiber optic switch apparatus of claim 1 wherein the spacing between the first and second fiber optic beam deflection arrays can be about zero.

7. The fiber optic switch apparatus of claim 1 wherein at least one of the first and second reflecting devices is partially transmissive and wherein the fiber optic switch apparatus further comprises
   a plurality of optical sensors mounted on the rear of the reflecting device on one or more of the surfaces fiber optic switch apparatus to monitor optical beams originated from the first fiber optic beam deflection array.

* * * * *